United States Patent
Martin et al.

(10) Patent No.: US 8,405,683 B2
(45) Date of Patent: Mar. 26, 2013

(54) METHOD FOR BROWSING THROUGH A LIST BY CONTINUOUS SCROLLING OF A GRAPHIC FEATURE AND RELATED TERMINAL

(75) Inventors: Jerôme Martin, Dammartin en Serve (FR); Isabelle Coullon, Grenoble (FR)

(73) Assignee: Thomson Licensing, Boulogne-Billancourt (FR)

( * ) Notice: Subject to any disclaimer, the term of this patent is extended or adjusted under 35 U.S.C. 154(b) by 377 days.

(21) Appl. No.: 11/992,619

(22) PCT Filed: Sep. 20, 2006

(86) PCT No.: PCT/EP2006/066559
§ 371 (c)(1), (2), (4) Date: Apr. 8, 2009

(87) PCT Pub. No.: WO2007/036473
PCT Pub. Date: Apr. 5, 2007

(65) Prior Publication Data
US 2009/0219304 A1    Sep. 3, 2009

(30) Foreign Application Priority Data
Sep. 27, 2005  (FR) ..................................... 05 52891

(51) Int. Cl.
*G09G 5/00*   (2006.01)
*G06F 3/048*  (2006.01)
(52) U.S. Cl. ......... 345/687; 345/684; 715/784; 715/830
(58) Field of Classification Search .................. 345/619, 345/684, 687; 715/784–786, 856, 858–860, 715/830; 725/56
See application file for complete search history.

(56) References Cited

U.S. PATENT DOCUMENTS

| 5,719,637 A * | 2/1998 | Ohkura et al. ............... 725/56 |
| 6,259,432 B1 * | 7/2001 | Yamada et al. ............... 715/784 |
| 6,571,390 B1 | 5/2003 | Dunn et al. |
| 7,293,244 B2 * | 11/2007 | Randall ....................... 715/784 |
| 2003/0076301 A1 | 4/2003 | Tsuk et al. |
| 2004/0125088 A1 * | 7/2004 | Zimmerman et al. ........ 345/173 |
| 2005/0251760 A1 * | 11/2005 | Sato et al. ..................... 715/856 |
| 2006/0242595 A1 * | 10/2006 | Kizumi ........................ 715/786 |

(Continued)

FOREIGN PATENT DOCUMENTS
EP    0707258    4/1996
EP    1124372    8/2001
(Continued)

OTHER PUBLICATIONS
Search Report Dated Dec. 4, 2006.

*Primary Examiner* — Chante Harrison
(74) *Attorney, Agent, or Firm* — Tutunjian & Bitetto, P.C.

(57) ABSTRACT

The present invention relates to a navigation method on elements extracted from a determined list of elements. A part at least of the elements of the list is displayed and a navigation command enables the user to move a graphical characteristic on the displayed elements. The maximum speed of movement of the graphical characteristic depends on the total number of elements of the list. According to an improvement, the acceleration of the scrolling speed when the user maintains the navigation command also depends on the total number of elements of the list. The invention also relates to a terminal featuring a user interface implementing the method.

3 Claims, 4 Drawing Sheets

U.S. PATENT DOCUMENTS

Figure 1:
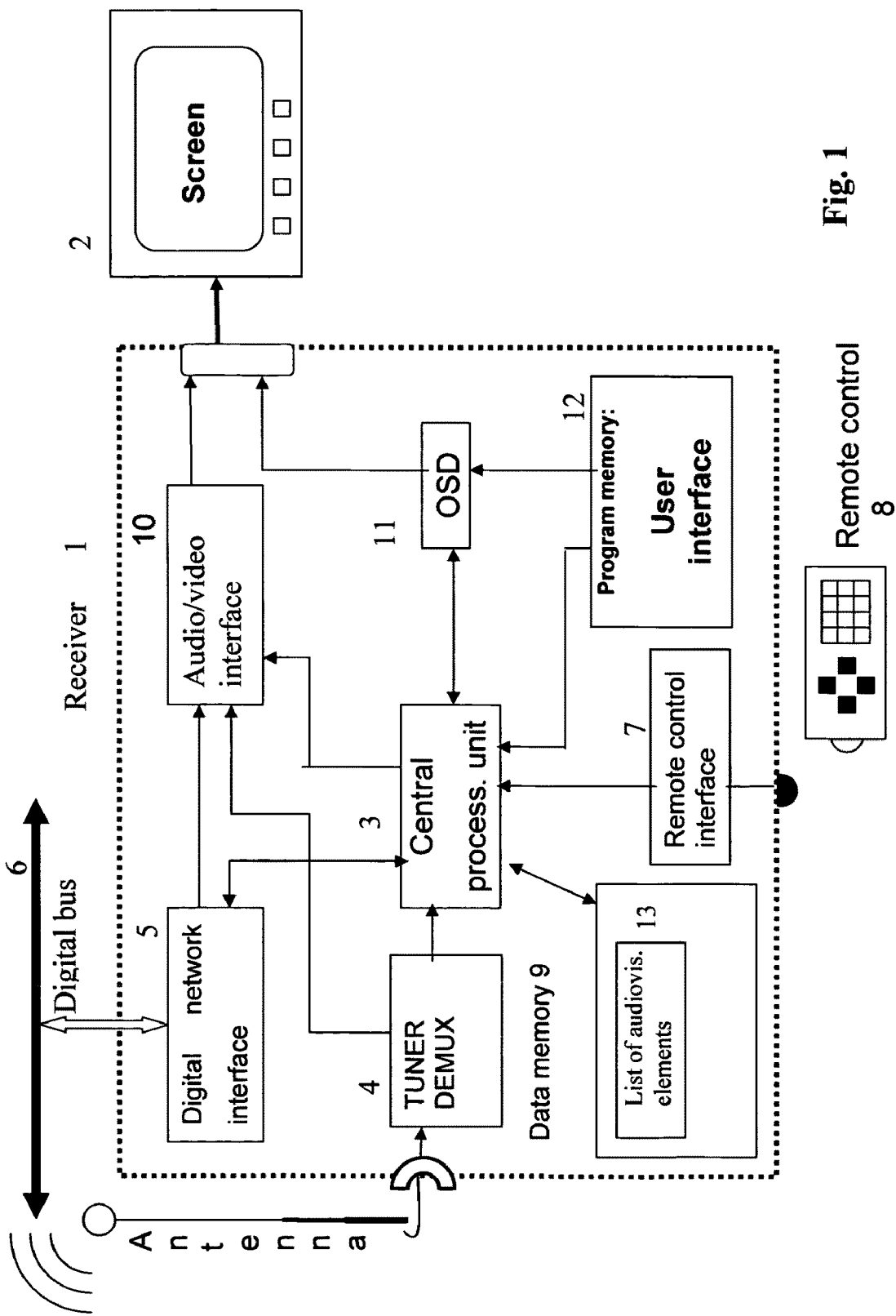

| | | | |
|---|---|---|---|
| 2007/0027959 A1* | 2/2007 | Harris et al. | 709/217 |
| 2007/0067328 A1 | 3/2007 | Mingot et al. | |
| 2007/0085841 A1* | 4/2007 | Tsuk et al. | 345/173 |
| 2007/0150830 A1* | 6/2007 | Ording et al. | 715/784 |
| 2007/0206831 A1* | 9/2007 | Matsuno et al. | 382/100 |
| 2008/0098330 A1* | 4/2008 | Tsuk et al. | 715/830 |
| 2010/0138776 A1* | 6/2010 | Korhonen | 715/786 |
| 2011/0022985 A1* | 1/2011 | Ording et al. | 715/830 |

FOREIGN PATENT DOCUMENTS

| | | |
|---|---|---|
| FR | 2855352 | 11/2004 |

\* cited by examiner

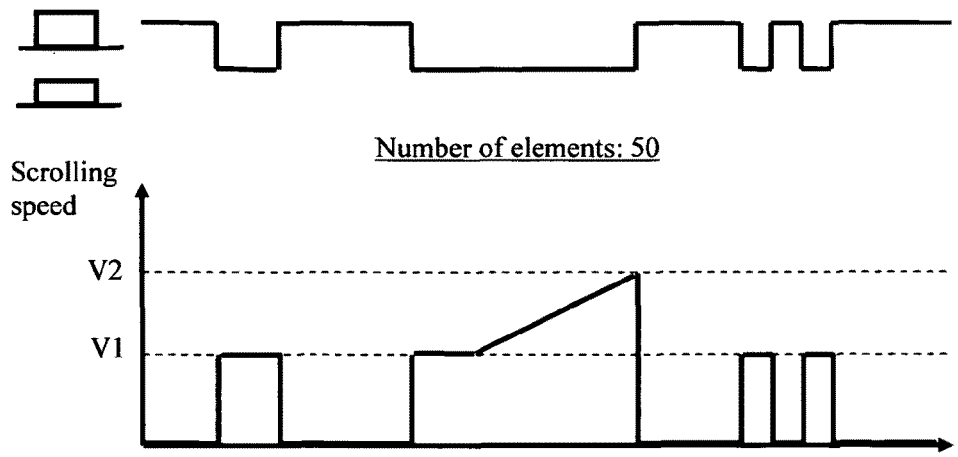
Fig. 4.a
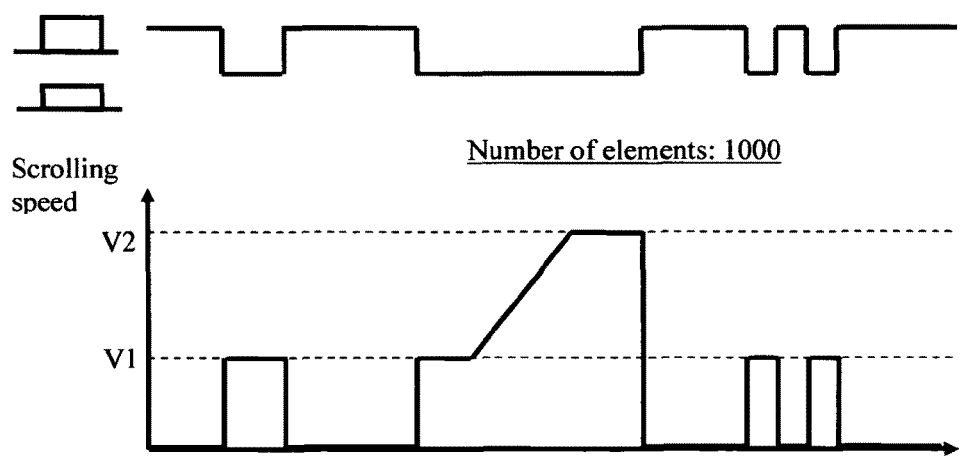
Fig. 4.b
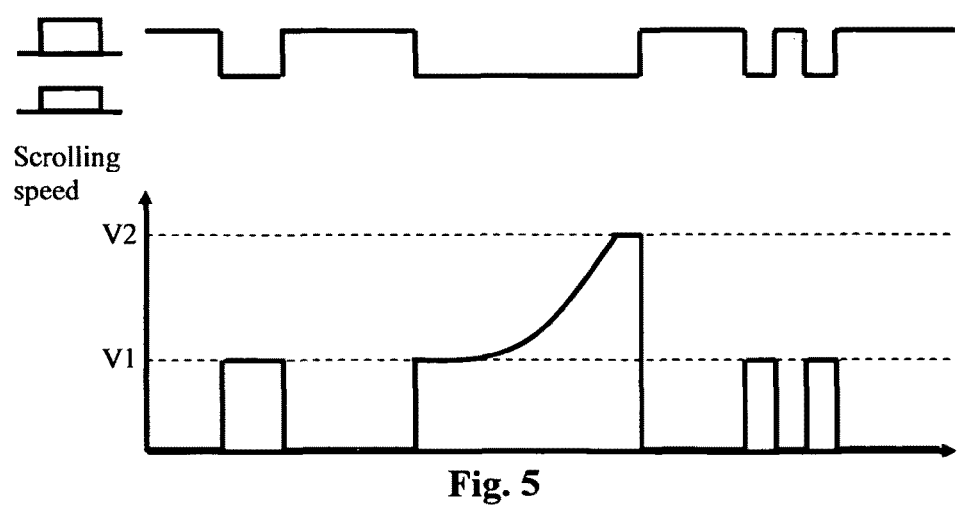
Fig. 5

METHOD FOR BROWSING THROUGH A LIST BY CONTINUOUS SCROLLING OF A GRAPHIC FEATURE AND RELATED TERMINAL

This application claims the benefit, under 35 U.S.C. §365 of International Application PCT/EP2006/066559, filed Sep. 20, 2006, which was published in accordance with PCT Article 21(2) on Apr. 5, 2007 in French and which claims the benefit of French patent application No. 0552891, filed Sep. 27, 2005.

The invention relates to a method for navigating a list of elements accessible using an audiovisual receiver, and an audiovisual terminal featuring a user interface for the navigation.

In a broadcast television system, the number of channels available can become very large. This is the case in the domain of digital television, hundreds of services are currently presented in the form of a list displayed on a screen. The user navigates within this list to select the one the interests him. The user operates the direction buttons to point to a service identified by its name, said service is then visually distinguished from the other services. This visual distinction enable the current service to be highlighted, it is also said to be the service having the "focus". This distinction is generally translated by a difference in color, grey level, or contrast with respect to the other services, or by a flashing or even by underlining. The display of the audiovisual content of the service is then commanded by pressing a validation button (OK, for instance). When many services are accessible, the user must run many navigation commands to finally focus on the required service and select it.

To limit the number of commands introduced, there are several solutions. One solution consists in segmenting the initial list into pages comprising a determined number of elements. In addition to the forward and backward (or left and right) direction buttons, the user has forward and backward page skips and can thus advance or reverse the focus within the list by skipping a group of elements. Another solution consists in performing a continuous and regular scrolling by pressing and holding a navigation button. The focus passes from one element of the list to another as long as the key is pressed down. To select an element, it is sufficient to wait for the positioning of the focus on this element, and stop pressing the button at that moment. An improvement of the previous solution consists in varying the scrolling speed according to the duration of pressing the button. The longer the button is pressed down, the faster the scrolling speed becomes. With a little practice, the user can advance rapidly to the part of the list where the element to select is found, then release the button, next continue at a slow speed for a short moment. By pressing briefly, the user approaches the element at a slow speed and can select it.

But this way of operating is not practical when the list contains few elements, indeed by maintaining the button pressed down, the focus is rapidly found at the end of the list, obliging the user to start again backwards. The U.S. Pat. No. 6,337,694 describes a navigation method within a list of elements. The screen displays a page of elements and the user navigates in this page. When the user presses the navigation buttons, the scrolling speed is calculated according to the number of elements displayed. The information of this document enables the navigation to be adapted to the number of displayed elements, and therefore does not suggest in any way adapting the speed according to the full list of elements. For example, if the number of displayed elements is large, the navigation speed is high. This high speed is not justified if the number of elements displayed is slightly smaller than the number of the full list.

The patent STUK US 2003/0076301 describes an MP3 player comprising a navigation interface for the selection of elements within a list of elements displayed on a screen. The user turns the wheel which causes a cursor to scroll over the list of elements. The acceleration applied to the scrolling depends on the acceleration applied to the wheel and the number of elements of the list. In this manner, the user can rapidly reach a zone where an element to find is located, then using the low amplitude rotation, he can position the cursor on a given element. This navigation interface can be used when one has a means for introducing a movement but not for a simple command introduction means, a button for example. Furthermore, this interface requires prior learning for its optimum use.

The present invention can be used to navigate within a list of elements with a suitable speed enabling the user to rapidly reach the element to be selected from the list.

The purpose of the present invention is a navigation method on elements, the elements being extracted from a list of a determined number of elements, comprising a display step of a part at least of the elements of the list; a continuous scrolling step of a graphical characteristic on the displayed elements, said continuous scrolling step being triggered by the introduction of a navigation command, characterized in that the scrolling of the graphical characteristic is carried out at a maximum speed that is determined according to the total number of elements of the list.

In this manner, the user has a very simple command, such as a keypad key for example, which controls the scrolling of the graphical characteristic from one element to the other, the maximum scrolling speed depends on the total number of elements of the list. Hence, the user does not need to know this number in order to adjust this speed in an optimum manner, the method does this for him.

According to a first improvement, as long as the navigation command is activated, the scrolling speed of the graphical characteristic changes until reaching the maximum scrolling speed depending on the total number of elements of the list. In this manner, the user can rapidly reach a determined zone of the list, and in this zone move at a different speed. According to another improvement, the scrolling speed of the graphical characteristic changes in a linear manner as soon as the navigation command is enabled. In this manner, the user can adjust his speed as he wishes. According to a variant, the scrolling speed does not change in a linear manner as long as the navigation command is enabled. Hence, the speed reaches its maximum value at the end enabling greater precision in the navigation to be obtained.

According to another improvement, the method comprises a display step of a visual indication representing the value of the scrolling speed. In this manner, at each moment, the user has a direct perception of the value of the speed. According to an improvement, the value of the scrolling speed is indicated by a bar of elements. The number of elements marked indicates the scrolling speed. All the elements are marked when the scrolling speed reaches the maximum speed.

According to another improvement, the user has commands enabling the scrolling speed to be increased and decreased. Hence, the user has an excellent control of the scrolling speed. According to one variant, the user has a command enabling the scrolling speed to be increased gradually, and a command enabling the scrolling to be stopped. In this manner, the user can stop the scrolling of the focus on the element required so as to enable it for example. According to an improvement, the two commands enabling the speed to be increased and to be stopped are from the same introduction means, the duration of pressing on this means differentiates the type of action. In this manner, the remote control can have a very limited number of buttons to operate the navigation.

The purpose of the present invention is also a display device comprising an introduction means of navigation commands, a display means of part at least of the elements of a list having a determined number of elements, a generation means of a continuous scrolling of a graphical characteristic on the displayed elements, the generation means of the scrolling being controlled by the command introduction means, characterized in that the generation means scrolls the graphical characteristic at a maximum speed that depends on the total number of elements of the list.

Figure 2:
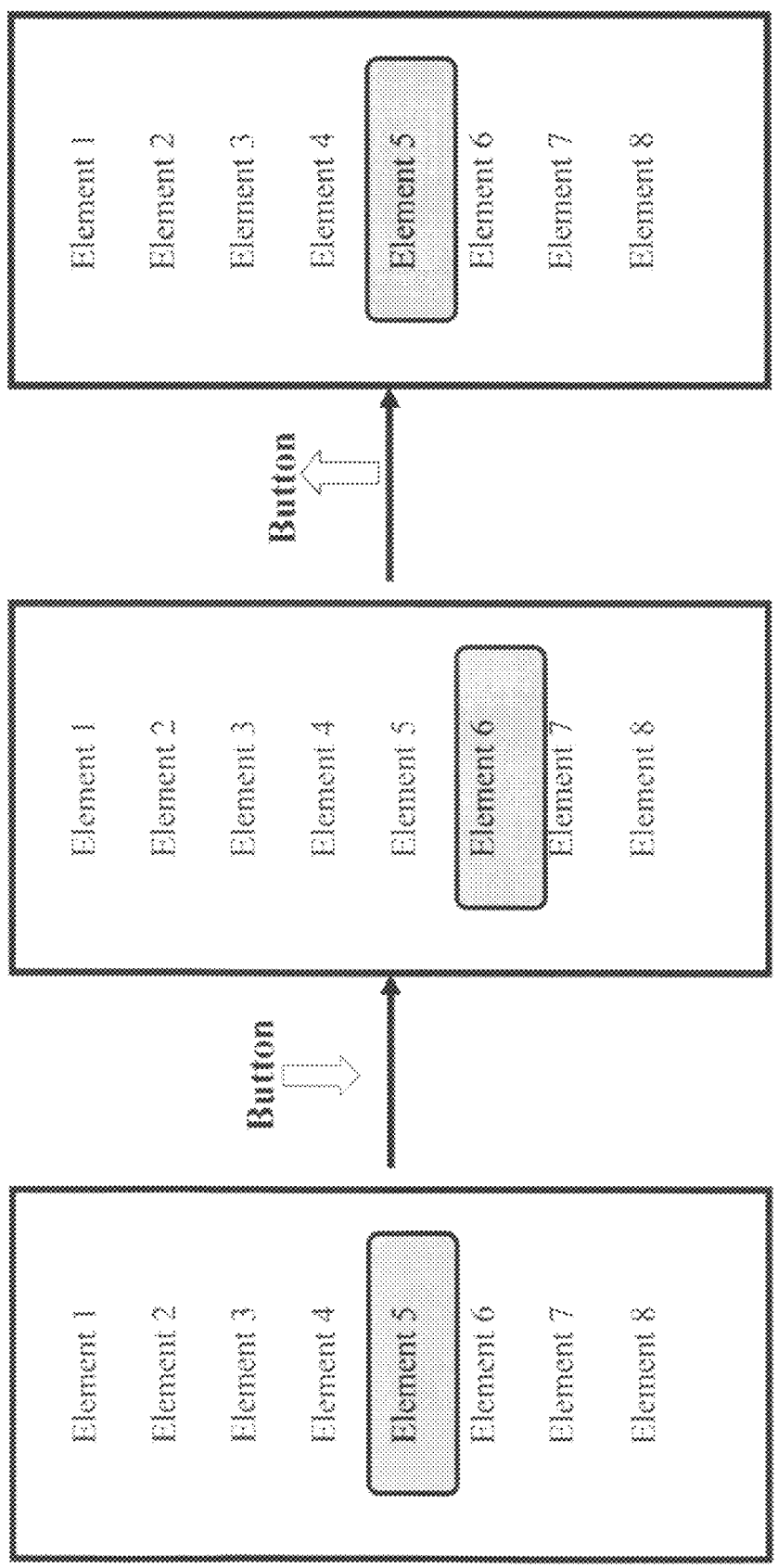
Figure 3:
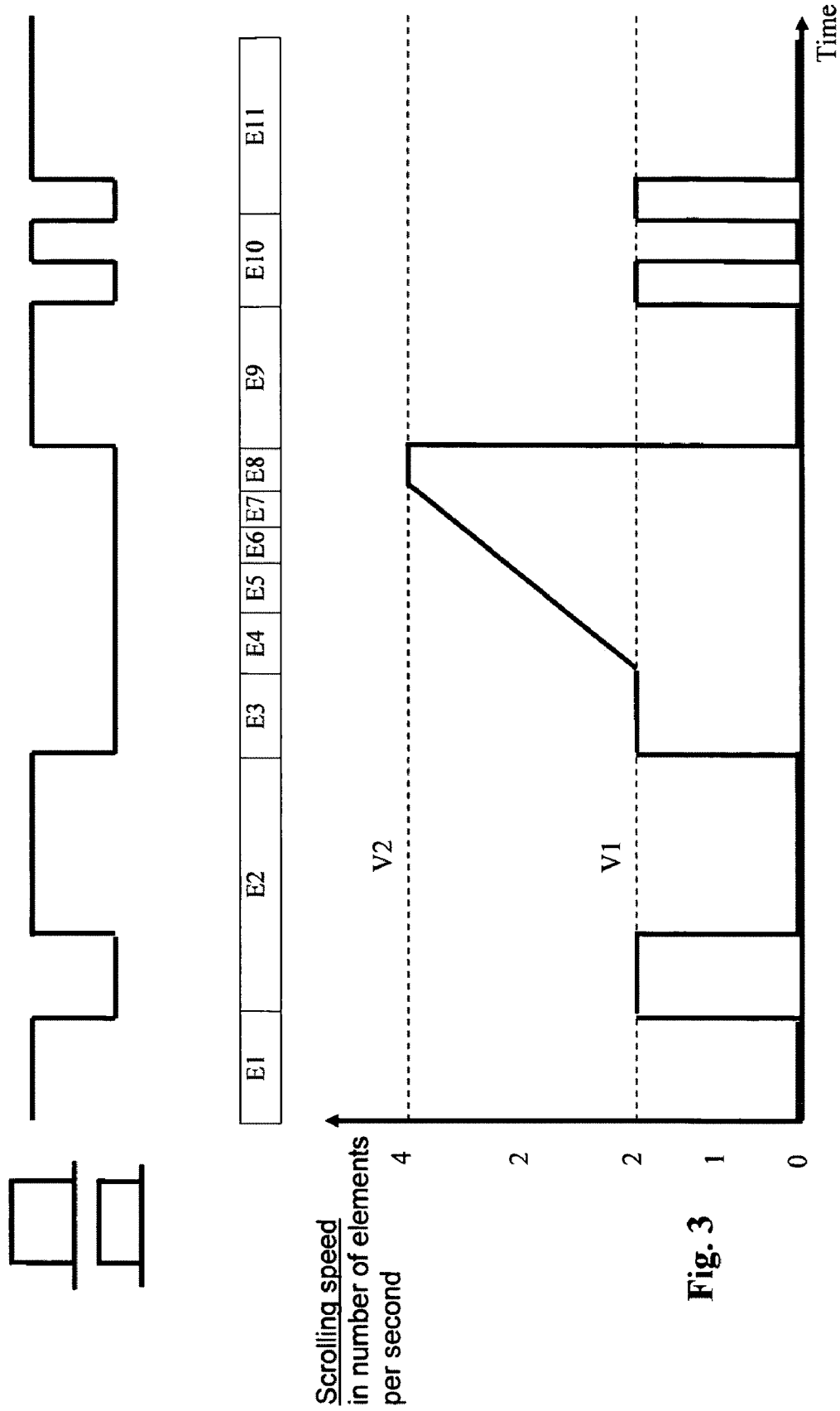

Other characteristics and advantages of the invention will emerge with the description of a non-restrictive embodiment of the invention, explained using the figures herein, among which:

FIG. 1 is a block diagram of a digital television reception system according to the present embodiment, FIG. 2 is an embodiment of three screen appearances showing the display of a list part following navigation commands, FIG. 3 is a graph showing the change in scrolling speed as a function of time where the button controlling the navigation speed is pressed and held, FIGS. 4a and 4b show two graphs illustrating the change in scrolling speed over the time the button is pressed down according to an improvement of the invention, FIG. 5 is a graph illustrating the change in speed according to another improvement of the invention, According to the present embodiment, the navigation terminal can be an interactive television set, it can also be a receiver designed for the reception of digital video data, or authorizing the connection to a bi-directional communication network, Internet for instance. The displayed elements are for example lists of services broadcasting audiovisual programs.

FIG. 1 is a block diagram of an audiovisual terminal. Terminal 1 is connected to a display screen 2, an antenna, itself connected to a reception means 4 that comprises a tuner that supplies a signal to a demodulator, the data received is corrected by a corrective circuit and sent to a demultiplexer. The demultiplexer comprises a certain number of filters programmed by a central unit 3 according to diverse applications supported by the receiver 1. The filters correspond to an item of identification information present in the header of the packets of the demodulated signal.

The sections of audio or video packets filtered by the demultiplexer are stored in the predefined zones of a data memory 9 for these applications. If necessary, the information is first deciphered by a deciphering circuit according to the rights of the user, before being stored in the data memory 9. The receiver also comprises an audio/video decoding logic 10 for the generation of audiovisual signals sent to the television screen 2, and possibly an interface 5 for the communication with a local digital bus 6 enabling audio/video data to be received from a bi-directional network with a storage in the memory 9. This network is for example an IEEE 1394 network. An executable program memory 12 contains the operating software of the receiver and the specific applications. According to the present embodiment, the memory 12 contains at least five applications: an audio decoder, a video decoder, a Teletext decoder, an access control unit, as well as a user interface module called "Navigator". For the clarity of the diagram, the memory 12 is shown in the form of a single block, but comprises at the same time the random access memory, the read only memory and the reprogrammable persistent memory (for example of the 'Flash' type).

The receiver also comprises an infrared interface 7 of a remote control 8, said interface also being connected to the microprocessor 3. The remote control features the navigation buttons ⇧, ⇩, ⇨, and ⇦ and "OK" and "Menu" whose function will be seen further on.

A character generator 11, often known as an OSD circuit, from "On Screen Display" enables the generation of command menus of graphics relating to the parameters of the receiver or to a particular application. The video signal generated by this character generator is multiplexed with one of the video signals coming from reception means 4 or from the interface 5 with the digital network to a first SCART socket connected to the display screen 2.

The embodiment is situated within the framework of a digital television broadcast system, for example of the DVB type (Digital Video Broadcast). The invention is not limited to this framework, and can be used in other environments where ordered lists of elements are presented to a user. The user interface comprises an electronic program guide application. This guide allows the user to access descriptive information relating to the services as well as the present and future events broadcast by these services. This information is derived from data also broadcast over the network. According to the present embodiment, this data is service data of the DVB, described in detail in the document "EN 300 468 Digital Video Broadcasting; Specification for Service Information (SI) in DVB systems". This document is published by the ETSI ("European Telecommunications Standards Institute"). This data is transported in the multiplexed stream received by the receiver in packets having identifiers marked in a known manner by the demultiplexer of the reception circuit 4 under the control of the microprocessor 3 and recovered by said microprocessor in a part of the data memory 9, for use by the user interface application. The data relating to the electronic program guide is organized in 'tables' describing the objects of the stream in a hierarchic manner. A description of the services available can be obtained in a known manner particularly from a table labeled 'SDT'. The hierarchy of the tables together with the identifiers of corresponding packets are described in the DVB document that has just been cited. For the extraction of packets containing the diverse tables, the demultiplexer filters are programmed in an appropriate manner.

Initially, the packets containing the services are grouped together in order to create a list of services available at the level of the receiver. This list is stored in a part 13 of the data memory 9. As this list contains many elements, it is not possible to display them all. The receiver thus displays sub-lists that are parts of the global list, the number of elements of a sub-list being determined by the receiver, this sub-list can contain only one element. As a background task, the receiver sends the video content of the current service that the user can select with the "program +" and "program −" buttons. The number and/or textual identifier of the current service is displayed in a small window of the screen, independently of the sub-lists displayed. The use of dedicated buttons for the selection of programs in no way limits the invention to this type of button, the use of "Up" and "Down" direction buttons to navigate a displayed list is completely conceivable.

Assume that the user starts the navigator for the display of a list of programs to select. FIG. 2 shows three examples of screen appearances showing the user interface generated by the navigator subsequent to the introduction of navigation commands. The left-hand part noted 2.A represents the initial appearance of the navigation. The screen shows a sub-list of 8 elements noted from the top to the bottom: "element 1" to "element 8". In the figure, the element 5 is the current element, as a result it has the focus. The central part noted B represents the screen appearance after the ⇩ button is pressed. In a manner known in itself, the focus moves to the element situated below: the element 6, this element is surrounded by two elements visible on the screen (appearance 2.B). Conversely, if the user presses the ⇧ button then the focus returns to the previous element: the element 5 (appearance 2.C). In this manner, the user can position the focus on the element that he wants and enable it, for example by pressing the OK button of the remote control. If the list displays services, the activation leads to the display of the program broadcast by this service.

FIG. 3 shows a graph representing the change in speed as a function of scrolling and commands introduced by the user. The curve at the top of the figure shows the pressed or released status of the navigation button. The bar below contains the number of the element having the focus as the time passes. In the lower part, the curve shows the change in value of scrolling speed as a function of time. The scrolling speed is expressed in number of elements having received the focus per unit of time, namely the second.

Initially, the user runs a display command of a list of elements. This list comprises a finite number of elements, the display program uses this list to determine the maximum scrolling speed V2. According to a simple embodiment, this number is the result of a refined function of the type $$V2=(A \times N)+B.$$

Where the values of $A=1/100$ and $B=2$, the equation becomes $V2=N/100+1$. If the list contains 10 elements, the maximum speed V2 is equal to 2.1 elements per second, which means that one element has the focus for 0.47 seconds. If the list contains 100 elements, the maximum speed V2 is equal to 3 elements per second, each element having the focus for a third of a second. Finally, if the list contains 400 elements, 6 elements per second will successively have the focus and the scrolling speed will be extremely rapid. As a result, this long list will rapidly be swept through. Types of equations other than the one described above can be used, for example a logarithmic equation:

$$V2=Log(A \times N)+B.$$

One variant consists in defining ranges of numbers of elements and assigning them a fixed scrolling speed. Here is an example of a table to obtain the scrolling speed according to the total number of elements of the list.

TABLE 1

| Total number of elements of the list | Maximum scrolling speed, in elements per second - V2 |
| --- | --- |
| Between 1 and 10 | 2 el./second |
| Between 11 and 30 | 2.25 el./second |
| Between 31 and 70 | 2.66 el./second |
| Between 71 and 150 | 3.5 el./second |
| Between 151 and 500 | 4.33 el./second |
| Over 500 | 6 el./second |

The navigation is conducted in the following manner: when the user briefly presses the button, typically one second maximum, there is no scrolling but passage from one element to the other in the direction of the movement indicated by the button. If the pressure is prolonged, then the navigator switches to a continuous scrolling mode. The transition from the element to element at each pressure mode to the continuous scrolling mode is made automatically as soon as the button is maintained pressed down for more than one second.

According to a very simple embodiment, the continuous scrolling mode only has one scrolling speed: V2 computed by means of the table above. Hence, the scrolling speed immediately reaches the maximum speed as soon as the button is pressed down. A variant illustrated by FIG. 3 consists in that, initially the scrolling speed is minimum; this speed represented by the symbol V1 in FIG. 3 is typically equal to 2 elements per second. Then, when the user presses the button for longer, the speed gradually increases to reach the maximum scrolling speed V2, dependent on the number of elements of the list.

In what precedes, the variation of the speed per unit of time to go from V1 to V2 is constant irrespective of the total number of elements of the list. Typically, this variation in speed, that one can call "acceleration" is situated at 0.3 elements per second up to reaching the maximum speed V2 according to the number of elements. Hence, for each second passed, the speed increases by 0.3 elements per second. A description will now be given of an improvement where the change in scrolling speed also depends on the total number of elements of the list. FIGS. 4a and 4b illustrate this improvement. The navigator determines the acceleration of the scrolling speed by a refined function of the type $$Acc=(C \times N)+D.$$

For example, $C=1/200$ and $D=0.1$, according to this example, if the list contains 100 elements, the speed value increases by 0.6 el./sec., until reaching the maximum scrolling speed V2.

A simple way to calculate the acceleration applied to the speed consists in defining the brackets of numbers of elements and in associating them with a fixed scrolling speed and an acceleration value. It is then sufficient to add a column to the table 1. Here is an example of a table enabling the scrolling speed and acceleration to be provided according to the number of elements, thus defining the change in speed as a function of time.

TABLE 2

| Total number of elements of the list | Maximum scrolling speed, in elements per second - V2 | Acceleration |
| --- | --- | --- |
| Between 1 and 10 | 2 el./second | 0.1 per second |
| Between 11 and 30 | 2.25 el./second | 0.3/sec. |
| Between 31 and 70 | 2.66 el./second | 0.5/sec. |
| Between 71 and 150 | 3.5 el./second | 0.8/sec. |
| Between 151 and 500 | 4.33 el./second | 1.1/sec. |
| Over 500 | 6 el./second | 1.5/sec. |

Assume that the list contains 50 elements, the parameters are V2=2.66 el./sec and the acceleration is equal to 0.5 every second until the maximum speed is reached. After pressing a second time, the navigator establishes the continuous scrolling mode with a minimum speed V1 of 2 elements per second. One second afterwards, the speed increases by 0.5 and reaches 2.5 elements per second. At three seconds, the speed computed is: 2.5+0.5=3 el./sec; exceeding the maximum speed, the navigator then maintains the scrolling at 2.66 el./sec. This improvement is particularly advantageous as, if the list contains a great number of elements, not only the maximum scrolling speed will be high but the time to reach this speed is shorter. In this manner, the user sweeps a long list more rapidly.

Another improvement consists in that the change in scrolling speed is not linear and obeys a mathematical function more complex than a linear function, in other words, the acceleration of the speed is not constant. For example, the change of the speed follows a parabolic curve, the relation linking the time of pressing ti and the speed Vi follows a function of the type $Vi=A \times ti^2+B \times ti+C$. In this manner, the user can adjust the speed at the start and when he presses down on the button for a long time, he reaches the maximum speed V2 more rapidly.

Another improvement consists in displaying a graphical representation of the value of the scrolling speed at a given moment. According to a preferred embodiment, this graphical representation is a color. Take the menu of FIG. 2, at the start the list displayed is white and the cursor is fixed. When the user presses the button, the displayed list becomes pink and remains in this color when the speed is minimum. As the speed increases, the color darkens and becomes red, without reducing the legibility of the texts of the list. In this manner, the user receives a more visual feedback of his display command. A variant of this improvement consists in displaying a bargraph comprising for example 10 elements that are either off or lit. When the navigation is at the minimum speed V1, then only one element is lit up and the nine others are off. The more the speed increases, the more the number of elements lit up increases. In this manner, when all the elements are lit up, the user knows that the maximum speed V2 has been reached.

In the previous paragraphs and FIGS. 3, 4 and 5, increasing speeds have been shown. The present invention cover the variant consisting in that the speed in continuous scrolling mode is first maximum: V2, always a function of the total number of elements of the list, then according to the buttons pressed to reduce the speed to reach a predetermined value V1. If the list is long, this enables a maximum speed to be obtained immediately, then if it is required to reduce the speed, the opposite navigation button is pressed, which reduces the speed by increments until the scrolling stops fully. The user thus perfectly controls the speed by using a button to increase it up to a maximum value, and a button to reduce it up to the stopping of the scrolling of the focus on the element required.

In the previous paragraphs, the scrolling stops when the user releases the button. A variant consists in that the speed is maintained constant when the user releases the button. In this manner, the user can control the speed perfectly. When the user wants to slow down the scrolling, he presses the opposite navigation button. For example, he presses the ⇒ button to start and accelerate the scrolling, and the ⇐ button to slow down, then stop and if the pressure continues, the scrolling starts again in the opposite direction. Another way to operate consists in using a button marked "STOP" to stop the scrolling suddenly. In this manner, the user has two buttons to control the advancement in the list, a first to progress at varying degrees of speed according to whether the button was pressed for more or less time, and another to stop. Another way to operate consists in replacing the action on the "STOP" button by briefly pressing the button, which stops the scrolling. Then the user can use the control of the speed by pressing more or less longer. This way to operate has the advantage of only using a single button to control the scrolling.

The presentation of the lists and sub-lists of services broadcast within the context of digital television must only be considered as one example of use of the present invention. The present invention applies to all lists of displayable elements on a screen or any other display means, notably, the lists of audiovisual programs, lists of source enabling documents to be procured, lists of functions accessible from a terminal, etc.

The invention also applies to all types of scrolling, and notably a carrousel scrolling where the element highlighted remains at the centre of the screen, in a frame for example, and in this case it is the elements of the list that scroll and are successively situated in the centre of the screen. In this case, only one button is sufficient. The carrousel moves in only one direction and the first element of the list succeeds the last. The invention also applies when the highlighted element is displayed within a grid of elements. In this case, the navigation commands involve the four directions Up, Down, Left, Right. A combination of buttons can also be considered, for example the buttons ⇧ and ⇐, which enables an oblique movement at a controlled speed.

The invention claimed is:

1. Navigation method on elements, the elements being extracted from a list of a determined number of elements, comprising:
   a display step of a part at least of the elements of the list;
   a continuous scrolling step of a graphical characteristic on the displayed elements, said continuous scrolling step being triggered by the introduction of a binary navigation command,
   wherein the scrolling of the graphical characteristic is carried out at a speed determined as $V=A \times ti^2+B \times ti+C$, where ti is a time of pressing, A and B are initial constant values, and C is an initial speed, and a maximum of the speed is determined according to the total number of elements of the list.

2. Navigation method on elements, the elements being extracted from a list of a determined number of elements, comprising:
   a display step of a part at least of the elements of the list;
   a continuous scrolling step of a graphical characteristic on the displayed elements, said continuous scrolling step being triggered by the introduction of a binary navigation command,
   wherein the scrolling of the graphical characteristic is carried out at a speed determined as $V=(A \times N)+B$, where A is an acceleration factor, N is the total number of elements of the list, and B is an initial value, and a maximum of the speed is determined according to the total number of elements of the list.

3. Navigation method on elements, the elements being extracted from a list of a determined number of elements, comprising:
   a display step of a part at least of the elements of the list;
   a continuous scrolling step of a graphical characteristic on the displayed elements, said continuous scrolling step being triggered by the introduction of a binary navigation command,
   wherein the scrolling of the graphical characteristic is carried out at a speed determined as $V=\log(A \times N)+B$, where A is an acceleration factor, N is the total number of elements of the list, and B is an initial value, and a maximum of the speed is determined according to the total number of elements of the list.

* * * * *